(12) United States Patent
Granger-Jones et al.

(10) Patent No.: US 9,787,353 B2
(45) Date of Patent: Oct. 10, 2017

(54) RADIO FREQUENCY (RF) FRONT-END WITHOUT SIGNAL SWITCHES

(71) Applicant: RF Micro Devices, Inc., Greensboro, NC (US)

(72) Inventors: Marcus Granger-Jones, Scotts Valley, CA (US); Dirk Robert Walter Leipold, San Jose, CA (US); George Maxim, Saratoga, CA (US); Baker Scott, San Jose, CA (US); Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 15/099,686

(22) Filed: Apr. 15, 2016

(65) Prior Publication Data

US 2017/0019143 A1  Jan. 19, 2017

Related U.S. Application Data

(60) Provisional application No. 62/191,583, filed on Jul. 13, 2015.

(51) Int. Cl.
*H04B 1/48*    (2006.01)

(52) U.S. Cl.
CPC ...................... *H04B 1/48* (2013.01)

(58) Field of Classification Search
CPC ............... H04B 1/40; H04B 1/44; H04B 1/48
See application file for complete search history.

(56) References Cited

U.S. PATENT DOCUMENTS

| | | | | |
|---|---|---|---|---|
| 8,909,308 B2* | 12/2014 | Ljung | ................ | H04B 7/0811 343/876 |
| 2010/0068998 A1* | 3/2010 | Zyambo | ................ | H02J 5/005 455/41.1 |
| 2011/0163824 A1* | 7/2011 | Kawano | ................ | H01F 21/02 333/17.3 |
| 2015/0035622 A1* | 2/2015 | Maxim | ................ | H03F 1/565 333/202 |
| 2015/0035637 A1* | 2/2015 | Maxim | ................ | H03F 1/565 336/192 |
| 2015/0084713 A1* | 3/2015 | Maxim | ................ | H03H 7/0161 333/17.1 |
| 2015/0084718 A1* | 3/2015 | Maxim | ............... | H01F 17/0013 333/174 |
| 2015/0092625 A1* | 4/2015 | Leipold | ............... | H01F 17/0013 370/278 |

(Continued)

*Primary Examiner* — Ankur Jain
*Assistant Examiner* — Max Mathew
(74) *Attorney, Agent, or Firm* — Withrow & Terranova. P.L.L.C.

(57) ABSTRACT

Disclosed is an RF front-end with improved insertion loss having at least a first resonator with a first port and a second port and at least a second resonator having a third port and a fourth port, wherein the first resonator and the second resonator are magnetically coupled by no more than 5%. Also included is at least one coupling structure coupled between the second port of the first resonator and the third port of the second resonator, wherein the coupling structure has a coupling control input for varying a coupling coefficient between the first resonator and the second resonator such that an RF signal transfer between the first port of the first resonator and the fourth port of the second resonator is controllably variable between 5% and 95%.

19 Claims, 13 Drawing Sheets

(56) References Cited

U.S. PATENT DOCUMENTS

2015/0123749 A1* 5/2015 Li ............................ H01L 24/00
  333/24 R
2016/0126623 A1* 5/2016 Maxim ................. H01L 23/315
  343/860
2016/0308576 A1* 10/2016 Khlat ........................ H04B 1/18

* cited by examiner

RADIO FREQUENCY (RF) FRONT-END WITHOUT SIGNAL SWITCHES

RELATED APPLICATIONS

This application claims the benefit of U.S. provisional patent application No. 62/191,583, filed Jul. 13, 2015, the disclosure of which is incorporated herein by reference in its entirety.

FIELD OF THE DISCLOSURE

The present disclosure relates to front-end module architecture for controlling signal flow between radio frequency (RF) components.

BACKGROUND

Traditional front-end modules use signal switches to control signal flow between RF components. For example, in transmit (TX) mode a TX signal is routed from an output of a power amplifier (PA) to an antenna through a signal switch comprised of a series stack of transistors. In such a case, practically all of the power of the TX signal is transferred through the signal switch. In receive (RX) mode an RX signal is routed from the antenna to a receiver through a signal switch. Moreover, there are front-end modules that are coupled to multiple antennas. In such cases, it is often advantageous to swap antennas between the TX mode and the RX mode. Signal switches are traditionally used to accomplish antenna swapping. Each signal switch used in a front-end module adds an insertion loss that degrades output power and efficiency in the TX mode along with degradation of noise figure (NF) and gain performance in the RX mode. What is needed is an RF front-end that provides on-off signal flow control and signal routing control without using signal switches.

SUMMARY

Disclosed is a radio frequency (RF) front-end without signal switches. The RF front-end includes at least a first resonator with a first port and a second port and at least a second resonator having a third port and a fourth port, wherein the first resonator and the second resonator are magnetically coupled. Also included is at least one coupling structure coupled between the second port of the first resonator and the third port of the second resonator, wherein the coupling structure has a coupling control input for varying a coupling coefficient between the first resonator and the second resonator such that RF signal transfer between the first port of the first resonator and the fourth port of the second resonator is variably controlled.

In an exemplary embodiment, an RF signal path between the first port of the first resonator and the fourth port of the second resonator is effectively switched off when the coupling coefficient is reduced to 5%, whereas a coupling coefficient of 95% effectively switches on the RF signal path. Further still, in the exemplary embodiment, magnetic coupling between the first resonator and the second resonator is no more than 5%.

In at least one embodiment, the RF front-end without signal switches further includes a digital controller having a coupling control output coupled to the coupling control input of the coupling structure for varying the coupling coefficient between the first resonator and the second resonator. In at least one exemplary embodiment, the digital controller commands the RF signal path to effectively switch on or off sending digital control values to the coupling structure through the coupling control input. In another exemplary embodiment, the first resonator and/or the second resonator each include a resonator control input that is coupled to the digital controller to command either passing or blocking RF signal transfer between the first port of the first resonator and the fourth port of the second resonator by digitally tuning to or away from pass and block resonant frequencies.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

It will be understood that when an element such as a layer, region, or substrate is referred to as being "over," "on," "in," or extending "onto" another element, it can be directly over, directly on, directly in, or extend directly onto the other element or intervening elements may also be present. In contrast, when an element is referred to as being "directly over," "directly on," "directly in," or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

Figure 1:
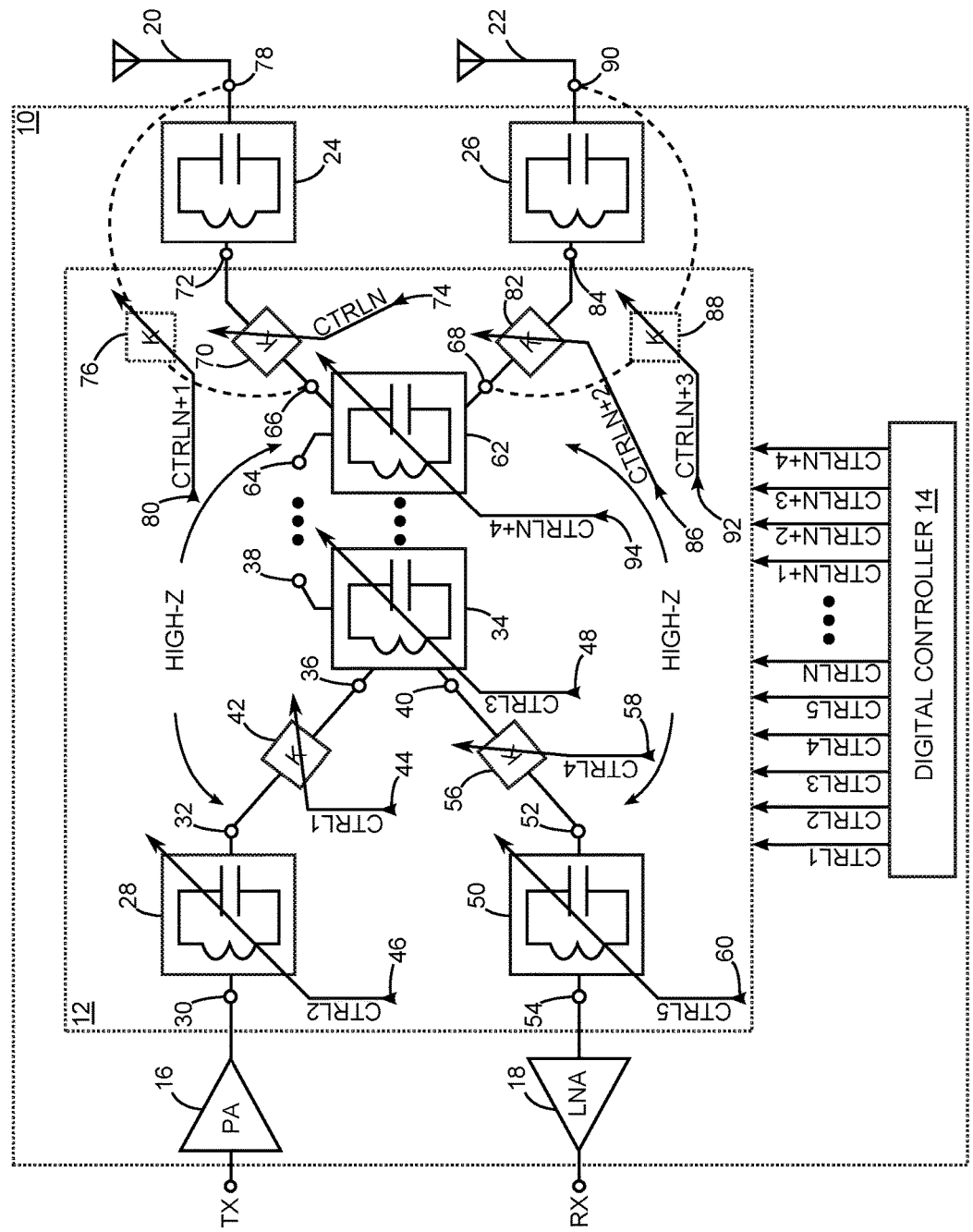
FIG. 1 is a schematic of an exemplary RF front-end that provides on-off signal flow control and signal routing control without using signal switches in accordance with the present disclosure.

FIG. 1 is a schematic of an exemplary RF front-end 10 that provides on-off signal flow control and signal routing control without the use of signal switches in accordance with the present disclosure. Coupling filter circuitry 12 is controlled by a digital controller 14 to selectively couple a power amplifier (PA) 16 and a low noise amplifier (LNA) 18 to a first antenna 20 and a second antenna 22. A first common resonator 24 is coupled between the first antenna 20 and the coupling filter circuitry 12. A second common resonator 26 is coupled between the second antenna 22 and the coupling filter circuitry 12. The first common resonator 24 and the second common resonator 26 are typically factory tuned to pass desired frequency bands and attenuate undesirable frequency bands. The PA 16 has a transmit (TX) input terminal through which TX signals pass to be amplified before being transmitted from either the first antenna 20 or the second antenna 22. The LNA 18 has a receive (RX) output terminal through which RX signals received by either the first antenna 20 or the second antenna 22 pass after being amplified by the LNA 18.

Coupling filter circuitry 12 provides an exemplary embodiment for TX signal and RX signal routing that also provides for antenna swapping. In this particular embodiment, a first resonator 28 has a first port 30 and a second port 32. A second resonator 34 has a third port 36 and a fourth port 38, and in this particular case, the second resonator 34 also includes a fifth port 40. The first resonator 28 and the second resonator 34 are magnetically coupled by no more than 5%. However, a first coupling structure 42 coupled between the second port 32 of the first resonator 28 and the third port 36 of the second resonator 34 has a variable coupling coefficient K. The variable coupling coefficient K is variable such that transfer of a TX signal between the first port 30 and the fourth port 38 of the second resonator 34 ranges between 5% and 95%. A first coupling control input 44 receives command signals over a first control line CTRL1 in communication with the digital controller 14.

In at least one embodiment, the coupling structure 42 provides electrical coupling between the first resonator 28 and the second resonator 34. An example of electrical coupling is capacitive coupling provided by a variable capacitance of a programmable array of capacitors (PACs) such as disclosed later and depicted in FIG. 12. However, it is to be understood that electrical coupling can also be accomplished by variable inductance using a programmable inductance array (not shown).

The first resonator 28 and the second resonator 34 provide variable frequency responses that can tune in or tune away from a select band of signal frequencies. For example, the first resonator 28 includes a second resonator control input 46 that receives control signals over a second control line CTRL2 in communication with the digital controller 14. Similarly, the second resonator 34 has a third resonator control input 48 that receives control signals over a third control line CTRL3 that is also in communication with the digital controller 14.

Either passing or blocking a TX signal output from PA 16 transferring between the first port 30 and the second port 32 of the first resonator 28 is further accomplished by digitally tuning to within a pass frequency range or a block frequency range by way of the second control line CTRL2. In at least one embodiment, a variable capacitance of PACs integrated within the first resonator 28 is used to change the resonant frequency of the first resonator 28 to either block or pass the TX signal. For example, the first resonator 28 will be tuned to pass the TX signal when the resonant frequency of the first resonator 28 is set to the center frequency of the TX signal. In contrast, when the first resonator 28 is tuned substantially away from the center frequency of the TX signal, the TX signal will be blocked from being transferred from the first port 30 to the second port 32. Digitally tuning to within a pass frequency range or a block frequency range by way of the third control line CTRL3 allows passing of the TX signal between the third port 36 and the fourth port 38 of the second resonator 34.

In operation, the digital controller 14 can simultaneously send command signals over the first control line CTRL1, the second control line CTRL2, and the third control line CTRL3 to tune the first resonator 28 to pass the TX signal to the coupling structure 42, which in turn passes the TX signal to the second resonator 34 which is tuned to pass the TX signal from the fourth port 38. In this way, the TX signal is transferred between the first port 30 of the first resonator 28 and the fourth port 38 of the second resonator 34.

The coupling filter circuitry 12 also includes a third resonator 50 having a sixth port 52 and a seventh port 54. The third resonator 50 and the second resonator 34 have a magnetic coupling of no more than 5%. However, a second coupling structure 56 with a variable coupling coefficient K is coupled between the fifth port 40 of the second resonator 34 and the sixth port 52 of the third resonator 50. The variable coupling coefficient K is variable such that transfer of an RX signal between the fifth port 40 and the sixth port 52 of the third resonator 50 ranges between 5% and 95%. A fourth coupling control input 58 receives command signals over a fourth control line CTRL4 in communication with the digital controller 14.

The third resonator 50 includes a fourth resonator control input 60 that receives control signals over a fifth control line CTRL5 that is in communication with the digital controller 14. Either passing or blocking an RX signal input to LNA 18 is further accomplished by digitally tuning to within a pass frequency range or a block frequency range by way of the fifth control line CTRL5. In at least one embodiment, a variable capacitance of PACs integrated within the third resonator 50 is used to change the resonant frequency of the third resonator 50 to either block or pass the RX signal. For example, the third resonator 50 will be tuned to pass the RX signal when the resonant frequency of the third resonator 50 is set to the center frequency of the RX signal. In contrast, when the third resonator 50 is tuned substantially away from the center frequency of the RX signal, the RX signal will be blocked from being transferred from the sixth port 52 to the seventh port 54. Digitally tuning to within a pass frequency range or a block frequency range by way of the fifth control line CTRL5 allows passing of the RX signal between the fifth port 40 and the seventh port 54 of the third resonator 50.

In operation, the digital controller 14 can simultaneously send command signals over the third control line CTRL3, the fourth control line CTRL4, and the fifth control line CTRL5 to tune the second resonator 34 to pass the RX signal to the second coupling structure 56, which in turn passes the RX signal to the third resonator 50. In this way, the RX signal is transferred between the fifth port 40 of the second resonator 34 and through the seventh port 54 of the third resonator 50 that is coupled to the LNA 18.

The TX signal and the RX signal are passed through additional resonators such as depicted as an Nth resonator 62 having an Nth port 64, an Nth+1 port 66, and an Nth+2 port 68. The Nth resonator 62 has no more than 5% magnetic coupling with any adjacent resonator. However, an Nth coupling structure 70 with a variable coupling coefficient K is coupled between the Nth+1 port 66 of the Nth resonator 62 and a first matching port 72 of the first common resonator 24. The variable coupling coefficient K is variable such that transfer of either the RX signal or the TX signal can be propagated between the Nth+1 port 66 and the first matching port 72 of the first common resonator 24 with a range between 5% and 95% efficiency. An Nth coupling control input 74 receives command signals over Nth control line CTRLN+4 that are in communication with the digital controller 14.

Alternatively, a first optional coupling structure 76 with a variable coupling coefficient K is usable to control coupling directly to the first antenna 20. The first optional coupling structure 76 is connected between the Nth+1 port 66 and a first antenna terminal 78. The variable coupling coefficient K for the first optional coupling structure 76 is controlled by way of an Nth+1 coupling control input 80 that receives commands from the digital controller over an Nth+1 control line CTRLN+1.

An Nth+2 coupling structure 82 with a variable coupling coefficient K is coupled between the Nth+2 port 68 of the Nth resonator 62 and a second matching port 84 of the second common resonator 26. The variable coupling coefficient K is variable such that transfer of either the RX signal or the TX signal can be propagated between the Nth+2 port 68 and the second matching port 84 of the second common resonator 26 with a range between 5% and 95% efficiency. An Nth+2 coupling control input 86 receives command signals over Nth+2 control line CTRLN+2 that is in communication with the digital controller 14.

Alternatively, a second optional coupling structure 88 with a variable coupling coefficient K is usable to control coupling directly to the second antenna 22. The second optional coupling structure 88 is connected between the Nth+2 port 68 and a second antenna terminal 90. The variable coupling coefficient K for the second optional coupling structure 88 is controlled by way of an Nth+3 coupling control input 92 that receives commands from the digital controller 14 over an Nth+3 control line CTRLN+3.

The Nth resonator 62 includes an Nth+4 resonator control input 94 that receives control signals over an Nth+4 control line CTRLN+4 that is in communication with the digital controller 14. Either passing or blocking an RX signal and a TX signal is further accomplished by digitally tuning to within a pass frequency range or a block frequency range by way of the Nth+4 control line CTRLN+4. In at least one embodiment, a variable capacitance of PACs integrated within the Nth resonator 62 is used to change the resonant frequency of the Nth resonator 62 to either block or pass the RX signal and the TX signal. For example, the Nth resonator 62 will be tuned to pass the TX signal when the resonant frequency of the Nth resonator 62 is set to the center frequency of the TX signal. In contrast, when the Nth resonator 62 is tuned substantially away from the center frequency of the TX signal, the TX signal will be blocked from being transferred from the Nth port 64, the Nth+1 port 66, and the Nth+2 port 68. Digitally tuning to within a pass frequency range or a block frequency range by way of the Nth+4 control line CTRLN+4 allows passing of the TX signal between the Nth port 64, the Nth+1 port 66, and the Nth+2 port 68 to one or the other of the first antenna 20 and the second antenna 22 provided an appropriate one of the Nth coupling structure 70, the fourth coupling structure 76, the Nth+2 coupling structure 82 and the second optional coupling structure 88 is commanded to pass the TX signal by the digital controller 14.

In operation, the digital controller 14 can simultaneously send command signals over the Nth control line CTRLN, or the Nth+1 control line CTRLN+1, and the Nth+4 control line CTRLN+4 to tune the Nth resonator 62 to pass an RX signal from the first antenna 20 through the Nth coupling structure 70 or through the first optional coupling structure 76. In this way, the RX signal is transferred between the first matching port 72 of the first common resonator 24 or directly from the first antenna terminal 78 and through the Nth port 64 of the Nth resonator 62 that is selectively coupled to the fourth port 38 of the second resonator 34 through ports of any intervening resonators (not shown, but are represented by ellipses). Similarly, a TX signal arriving on the Nth port 64 is transferred to the first antenna 20 when the Nth resonator 62, the Nth coupling structure 70 or the first optional coupling structure 76 are each tuned to pass the TX signal by command of the digital controller 14.

Further still, the digital controller 14 can simultaneously send command signals over the Nth+2 control line CTRLN+2, or the Nth+3 control line CTRLN+3, and the Nth+4 control line CTRLN+4 to tune the Nth resonator 62 to pass an RX signal from the second antenna 22 through the Nth+2 coupling structure 82 or through the second optional coupling structure 88. In this way, the RX signal is transferred between the second matching port 84 of the second common resonator 26 or directly from the second antenna terminal 90 and through the Nth port 64 of the Nth resonator 62 that is selectively coupled to the fourth port 38 of the second resonator 34 through ports of any intervening resonators (not shown, but are represented by ellipses). Similarly, a TX signal arriving on the Nth port 64 is transferred to the second antenna 22 when the Nth resonator is 62, the Nth+2 coupling structure 82 or the second optional coupling structure 88 are each tuned to pass the TX signal by command of the digital controller 14.

Figure 2:
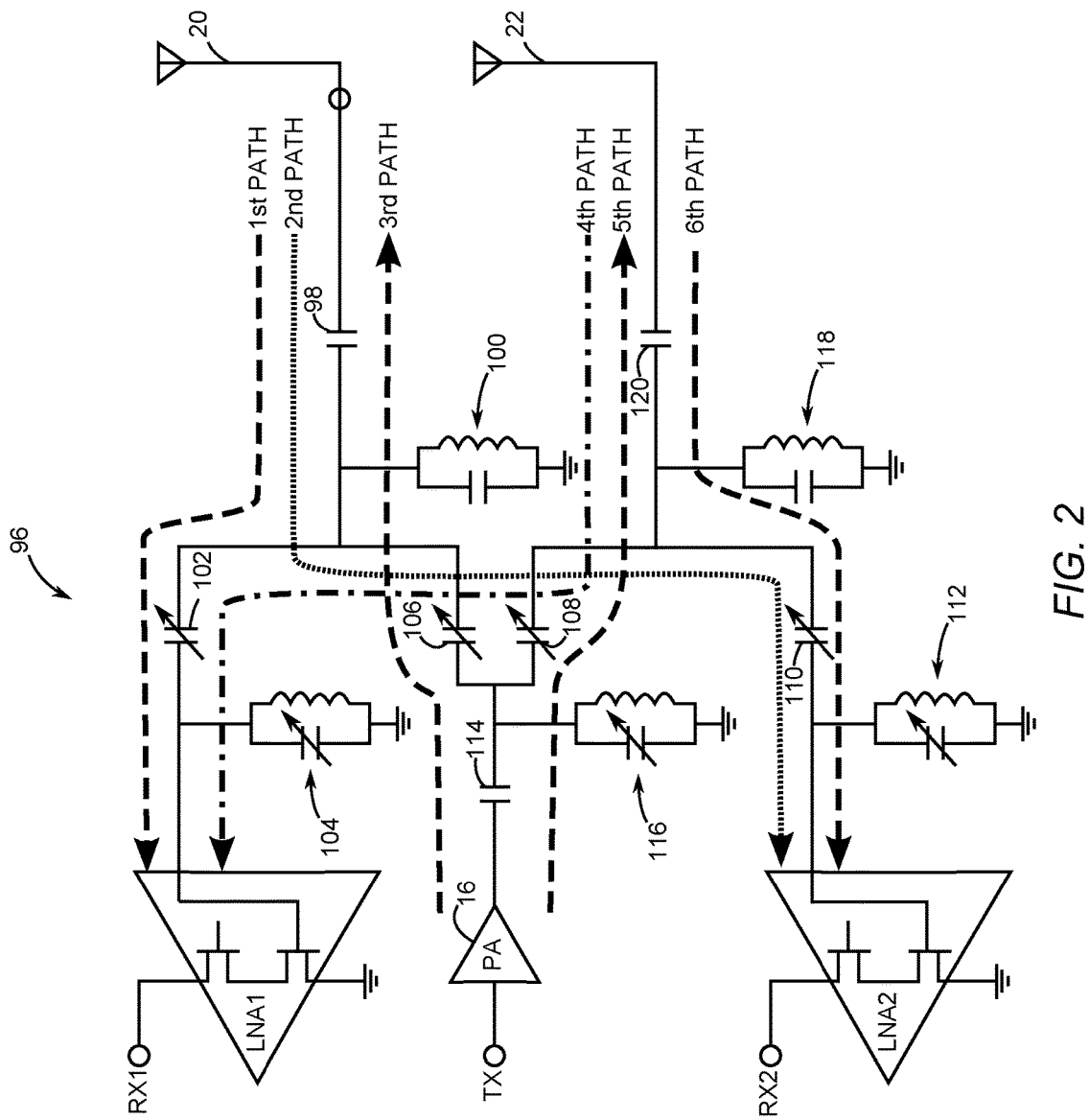
FIG. 2 is a schematic of an exemplary embodiment of a hybrid RF-front-end for transmit (TX) and receive (RX) multiplexing and antenna swapping that employs tunable coupling without signal switches.

FIG. 2 is a schematic of an exemplary embodiment of an exemplary hybrid RF-front-end 96 for transmit (TX) and receive (RX) multiplexing and antenna swapping that employs tunable coupling without signal switches. A first signal path transfers an RX signal impinging on the first antenna 20, through a first coupling capacitor 98, past a first common resonator 100, through a first RX coupling structure 102 and past a first RX resonator 104 when a variable coupling coefficient K of the first RX coupling structure 102 is set to pass the RX signal and the first RX resonator 104 is in tune with the RX signal. A low noise amplifier LNA1 amplifies the RX signal and passes the amplified RX signal through a first output RX1.

A second signal path transfers an RX signal impinging on the first antenna 20, through the first coupling capacitor 98, past the first common resonator 100, through a first TX/RX coupling structure 106, through a second TX/RX coupling structure 108, through a second RX coupling structure 110 and past a second RX resonator 112 when coupling coefficients K of the first TX/RX coupling structure 106, the second TX/RX coupling structure 108, and the second RX coupling structure 110 are set to pass the RX signal and the second RX resonator 112 is tuned to be anti-resonant with the RX signal. A second low noise amplifier LNA2 amplifies the RX signal and passes the amplified RX signal through an output RX2.

A third signal path is usable to route a TX signal from the PA 16 to the first antenna 20. In this case, a TX signal passes through a second coupling capacitor 114, passes by a TX resonator 116 and passes through the first TX/RX coupling structure 106 before passing by the first common resonator 100 and through the first coupling capacitor 98 before impinging on the first antenna 20 when a variable coupling coefficient K of the first TX/RX coupling structure 106 is set to pass the TX signal and the TX resonator 116 is tuned to be anti-resonant with the TX signal.

A fourth signal path transfers an RX signal impinging on the second antenna 22, through a third coupling capacitor 120, past a second common resonator 118, through the second TX/RX coupling structure 108, through the first TX/RX coupling structure 106, through the first RX coupling structure 102 and past the first RX resonator 104 when coupling coefficients K of the first TX/RX coupling structure 106, the second TX/RX coupling structure 108, and the first RX coupling structure 102 are set to pass the RX signal and the first RX resonator 104 is tuned to be anti-resonant with the RX signal. The first low noise amplifier LNA1 amplifies the RX signal and passes the amplified RX signal through the first RX output RX1.

A fifth signal path is usable to route a TX signal from the PA 16 to the second antenna 22. In this case, a TX signal passes through the second coupling capacitor 114, passes by the TX resonator 116 and passes through the second TX/RX coupling structure 108 before passing by the second common resonator 118 and through the third coupling capacitor 120 before impinging on the second antenna 22 when a variable coupling coefficient K for the second TX/RX coupling structure 108 is set to pass the TX signal and the TX resonator 116 is tuned to be anti-resonant with the TX signal.

A sixth signal path transfers an RX signal impinging on the second antenna 22, through the third coupling capacitor 120, past the second common resonator 118, through the second RX coupling structure 110 and past the second RX resonator 112 when a variable coupling coefficient K of the second RX coupling structure 110 is set to pass the RX signal and the second RX resonator 112 is tuned to be anti-resonant with the RX signal. The second low noise amplifier LNA2 amplifies the RX signal and passes the amplified RX signal through the second output RX2.

Figure 3:
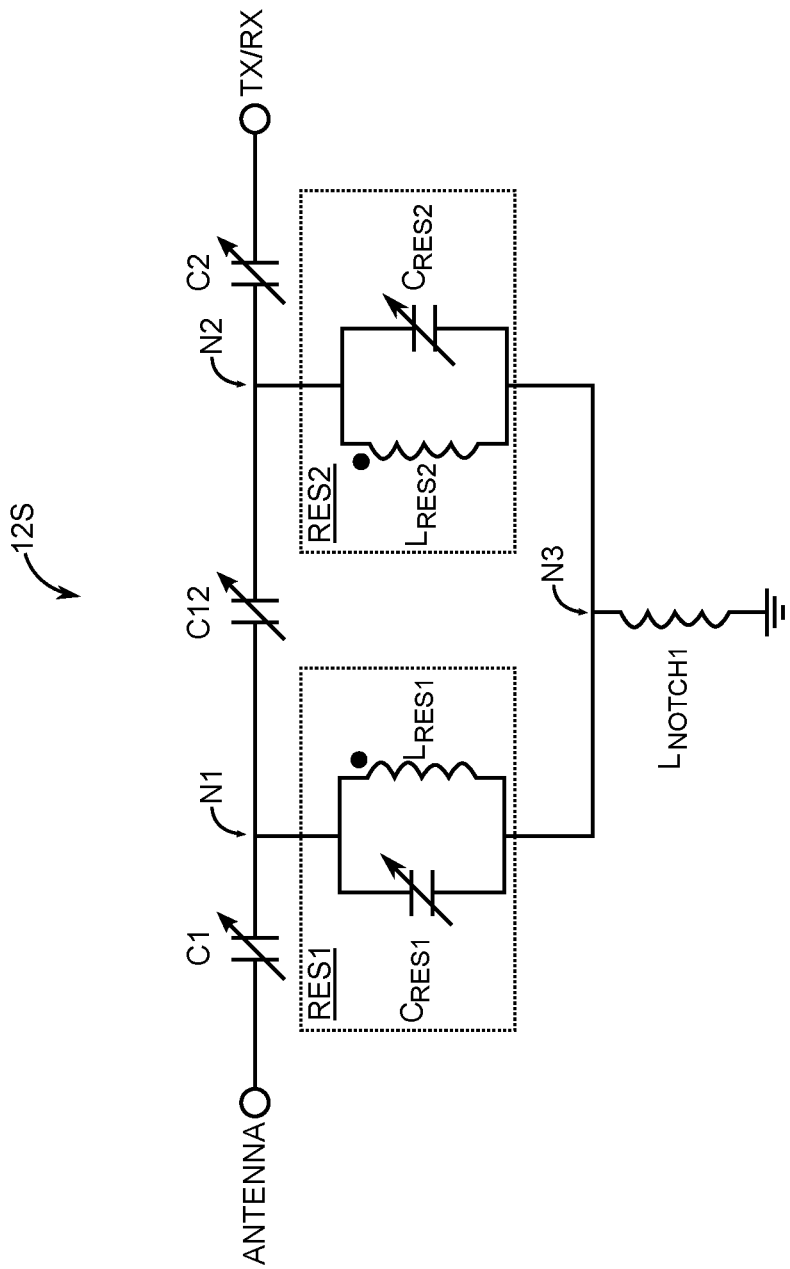
FIG. 3 is a detailed schematic of coupling filter circuitry with adjustable coupling coefficients provided by variable capacitors and resonators with an adjustable center frequency that provides a tune-in/tune-away function.

FIG. 3 is a detailed schematic of coupling filter circuitry 12S with adjustable coupling coefficients provided by variable capacitors C1, C12, and C2 and a first resonator RES1 and a second resonator RES2. The coupling filter circuitry 12S has an adjustable center frequency that is usable to provide a tune-in/tune-away function. FIG. 3 provides an exemplary topology in which a first capacitor C1 is coupled between an antenna port and a first node N1, a second capacitor C12 is coupled between the first node N1 and a second node N2, and a third capacitor C2 is coupled between the second node N2 and a TX/RX port. The first capacitor C1, the second capacitor C12, and the third capacitor C2 each have variable capacitance that is digitally controllable by the digital controller 14 (FIG. 1).

The first resonator RES1 is coupled from the first node N1 to a third node N3 and the second resonator RES2 is coupled from the second node N2 to the third node N3. The first resonator RES1 is made up of a first resonator capacitor $C_{RES1}$ that is coupled in parallel with a first resonator inductor $L_{RES1}$. Similarly, the second resonator RES2 is made up of a second resonator capacitor $C_{RES2}$ that is coupled in parallel with a second resonator inductor $L_{RES2}$. Both, the first resonator capacitor $C_{RES1}$ and the second resonator capacitor $C_{RES2}$ have variable capacitances that are digitally controllable by the digital controller 14 (FIG. 1). Also note that while phase dot orientation for the first resonant inductor $L_{RES1}$ and the second resonant inductor $L_{RES2}$ are depicted in-phase, in some embodiments the first resonant inductor $L_{RES1}$ and the second resonant inductor $L_{RES2}$ can be out-of-phase. Performance of the coupling filter circuitry 12S is enhanced by a notch filter inductor $L_{NOTCH1}$ that is coupled between the third node N3 and ground.

Figure 4:
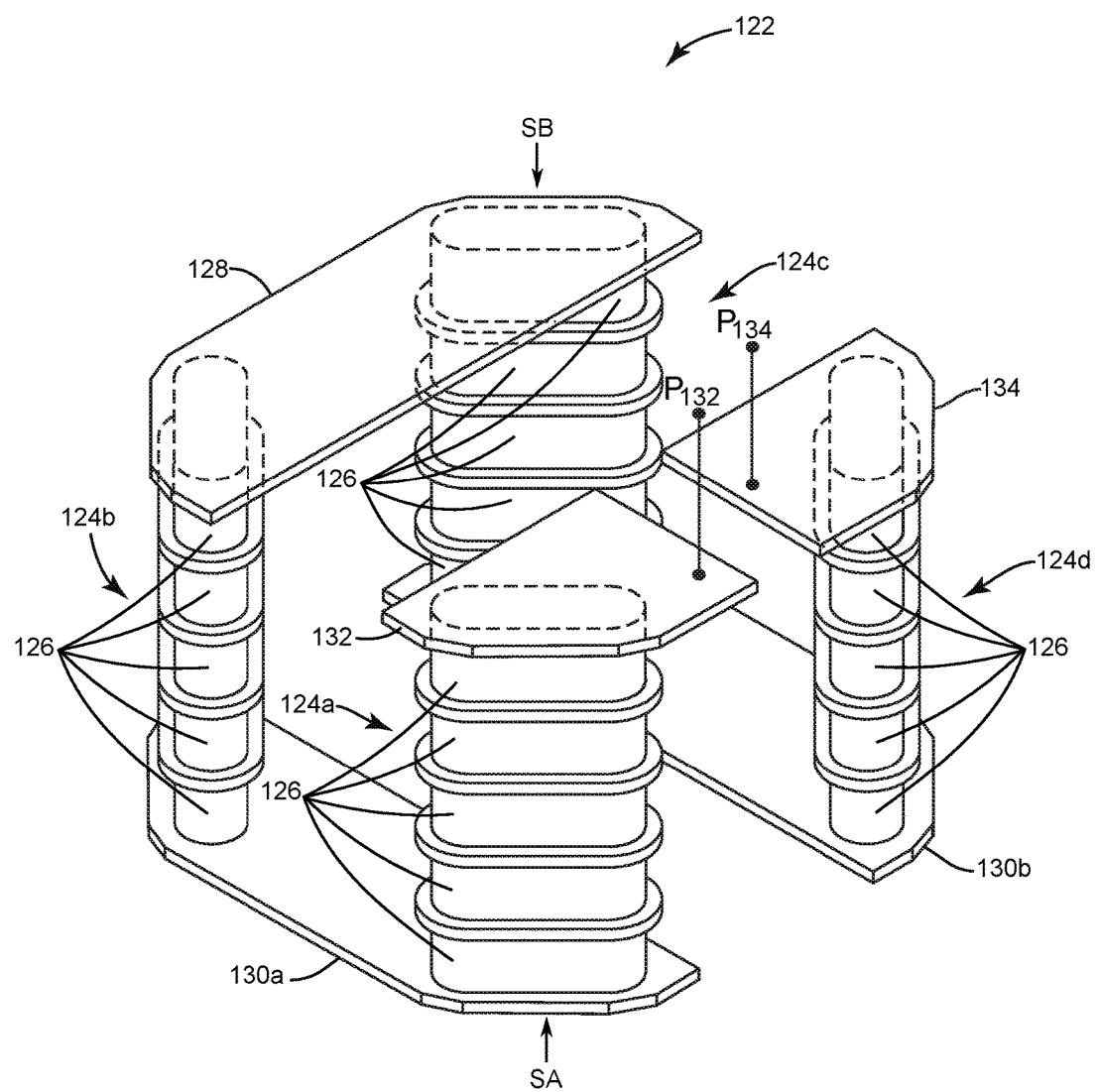
FIG. 4 is a three dimensional (3D) drawing of a 3D inductor usable with embodiments of the present disclosure.

A three dimensional (3D) inductor 122 usable with embodiments of the present disclosure is shown in FIG. 4. The 3D inductor 122 comprises four solid via columns (referred to generically as element 124, and specifically as solid via columns 124a, 124b, 124c, and 124d). Each of the solid via columns 124 comprises solid via bars 126. The 3D inductor 122 also comprises three connector plates 128, 130a, and 130b. The connector plate 128 connects the solid via column 124b to the solid via column 124c on a first side SA of the 3D inductor 122. On a second side SB of the 3D inductor 122 that is antipodal to the first side SA, the connector plate 130a connects the solid via column 124a to the solid via column 124b, and the connector plate 130b connects the solid via column 124c to the solid via column 124d. The 3D inductor 122 further comprises two terminal plates 132 and 134. The terminal plates 132 and 134 comprise a terminal connection for the 3D inductor 122 and are connected to the solid via columns 124a, 124d, respectively, at the first side SA. The terminal plates 132 and 134 can be connected to ports $P_{132}$ and $P_{134}$, respectively, for connection to an external component, such as, but not limited to, a tunable capacitor. Note that the 3D inductor 122 is also a three-dimensional inductor structure. Furthermore, while the 3D inductor 122 has a cubic structure, other embodiments of the 3D inductor 122 may be another shape. For example, an alternative embodiment of the 3D inductor 122 is spherical.

Current from the port $P_{132}$ flows to and across the terminal plate 132 down the solid via column 124a to the connector plate 130a. The current flow continues across the connector plate 130a up through the solid via column 124b to the connector plate 128. The current flow then continues across the connector plate 128 down through the solid via column 124c to the connector plate 130b. The current flow continues up through the solid via column 124d to the terminal plate 134 and up through the port $P_{134}$. Since the current direction of one solid via column 124 is parallel to an adjacent solid via column 124 (for example, the adjacent solid via columns 124a and 124b), the magnetic fields generated from each individual solid via column 124 cancel each other, confining the magnetic field to the interior of the 3D inductor 122. Thus, the 3D inductor 122 contains a small, or substantially zero, coupling factor. For the purpose of this disclosure, a small (i.e., weak) coupling factor is one that is less than 5%. As such, the solid via columns 124a, 124b, 124c, 124d, the connector plates 128, 130a, 130b, and the terminal plates 132, 134 are arranged such that the magnetic field generated by the 3D inductor 122 is substantially confined to the interior of the 3D inductor 122.

The substrate (not shown) may be any type of substrate made from suitable non-conductive material(s) and/or semiconductor material(s). Exemplary non-conductive materials include laminate, a semiconductor material, glass, a dielectric, plastic, fiber, and/or the like. Exemplary semiconductor materials include Silicon (Si), Silicon Germanium (SiGe), Gallium Arsenide (GaAs), Indium Phosphorus (InP), and/or the like. The substrate may also be single layered or multi-layered. Conductive structures (e.g., the 3D inductor 122 shown in FIG. 4, connection paths, transmission paths, contact pads, terminals, passive circuit elements, etc.) may be formed on and/or within the substrate. The conductive structures may be metallic structures made from any type of metal(s) including, for example, copper (Cu), gold (Au), silver (Ag), Nickel (Ni), metallic alloys, and/or the like. Conductive materials may also be non-metallic conductive materials (e.g., graphene). In this embodiment, the substrate is a multi-layered substrate made from a laminate. The multi-layered substrate thus includes a plurality of laminated substrate layers and metallic structures formed on and between the laminated substrate layers. The laminated substrate layers may be formed from laminates such as FR-1, FR-2, FR-3, FR-4, FR-5, FR-6, CEM-1, CEM-2, CEM-3, CEM-4, CEM-5, CX-5, CX-10, CX-20, CX-30, CX-40, CX-50, CX-60, CX-70, CX-80, CX-90, CX-100, and/or the like. In this embodiment, the multi-layered substrate includes standard tube vias.

While the specific embodiments described in this disclosure are implemented using a multi-layered substrate, the 3D inductor 122 described herein is not limited to multi-layered substrates. Alternatively, the 3D inductor 122 may be implemented using single-layered substrates.

With regard to the 3D inductor 122, the terminal plates 132 and 134 and the connector plate 128 are created in conductive layers of the multi-layered substrate. The solid via bars are created in non-conductive layers and provide a connection between the connective layers in the multi-layered substrate to create the solid via columns 124. A magnetic field H of the 3D inductor 122 is parallel to the design plane of the multi-layered substrate, reducing the coupling factor of the 3D inductor 122. A width of the solid via columns 124 can be increased to improve the metal density of the 3D inductor 122 to achieve a high quality (Q) factor without increasing the inductive resistance of the 3D inductor 122. For the purpose of this disclosure a high Q is defined as being at least 100. In at least one embodiment, the Q of the 3D inductor 122 ranges from 100 to 200.

Figure 5:
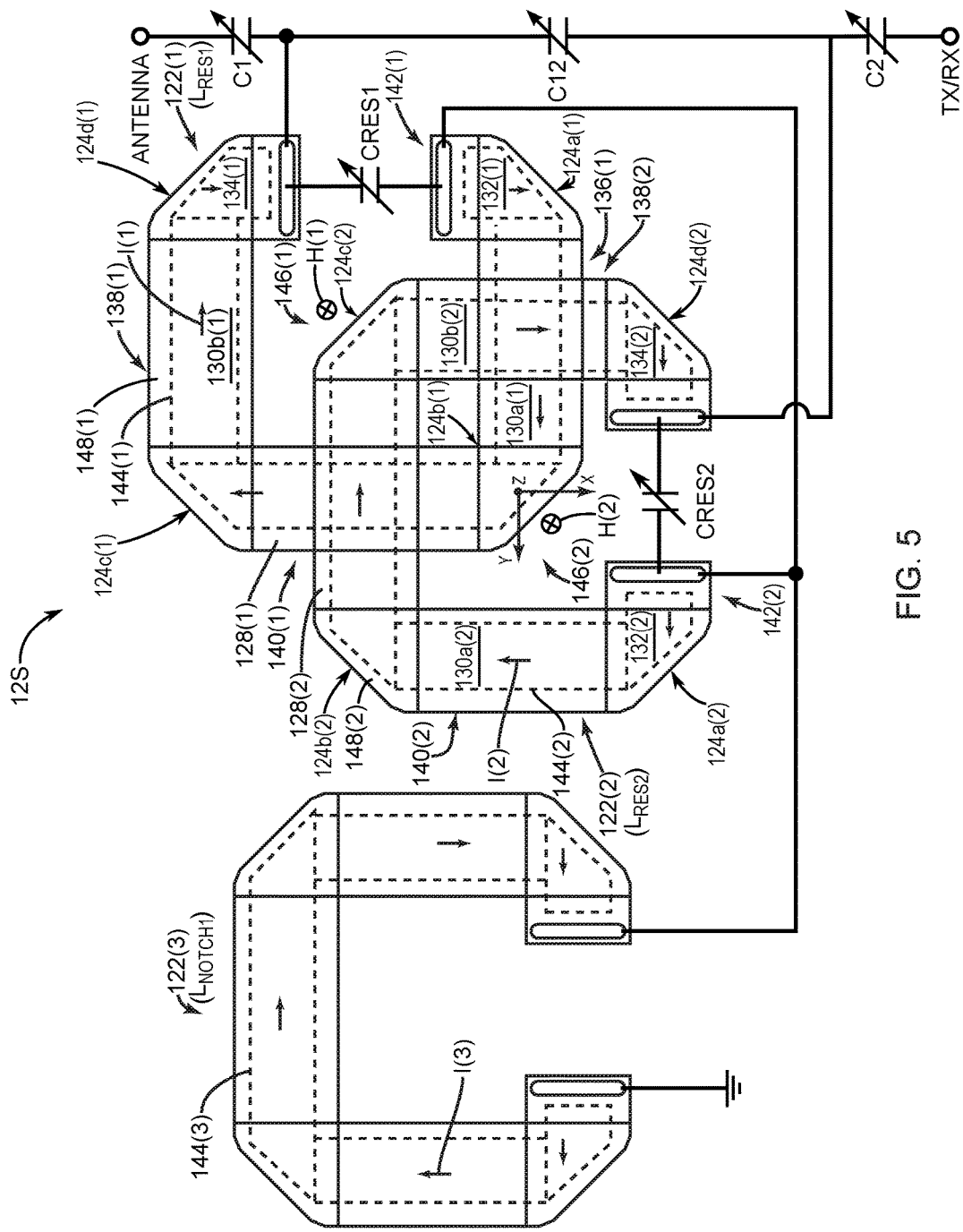
FIG. 5 is a top view of a layout of three 3D inductors of FIG. 4 that are arranged to implement the coupling filter circuitry of FIG. 3.

FIG. 5 illustrates one embodiment of the coupling filter 12S depicted schematically in FIG. 3. In this particular embodiment, the coupling filter 12S includes a first 3D inductor 122(1) for $L_{RES1}$, a second 3D inductor 122(2) for $L_{RES2}$, and a third 3D inductor 122(3) for $L_{NOTCH1}$ described above with respect to FIG. 4. In this embodiment, the 3D inductor 122(1) is oriented in a different manner than the 3D inductor 122(2). It should be noted that the 3D inductor 122(1), the 3D inductor 122(2) and the 3D inductor 122(3) have been drawn in a more simplified manner in FIG. 5 for clarity. The 3D inductor 122(1) and the 3D inductor 122(2) are weakly magnetically coupled to one another having less than 5% magnetic coupling.

As shown in FIG. 5, the 3D inductor 122(1) is rotated with respect to the 3D inductor 122(2) relative to the x-y plane. In this embodiment, the 3D inductor 122(1) is rotated with respect to the 3D inductor 122(2) relative to the x-y plane by approximately 90 degrees. Thus, a first turn 138(1) and a second turn 138(1) of the 3D inductor 122(1) each face the y-z plane while a third turn 140(1) and a segmented fourth turn 142(1) of the 3D inductor 122(1) each face the x-z plane. The 3D inductor 122(1) and the 3D inductor 122(2) also have x-y displacement. However, the 3D inductor 122(1) and the 3D inductor 122(2) also have a displacement relative to the z-axis. The displacement relative to the z-axis allows the connector plate 128(2) to cross the connector plate 128(1) and allows a connector plate 130b(2) to cross the connector plate 130a(1). In this way, the 3D inductor 122(1) is inserted into the 3D inductor 122(2) so that a conductive path 144(1) partially extends through a 3D volume 146(2) of the 3D inductor 122(2). As such, the 3D inductor 122(1) is inserted into the 3D inductor 122(2) so that a 3D volume 146(1) of the 3D inductor 122(1) partially overlaps the 3D volume 146(2).

In this exemplary embodiment, a third turn 140(2) of the 3D inductor 122(2) and the third turn 140(1) of the 3D inductor 122(1) are interweaved so that the elongated via column 124b(1) of the conductive path 144(1) extends through the 3D volume 146(2) and the interior of the 3D inductor 122(2). Additionally, the connector plate 128(1) partially extends through the 3D volume 146(2). Furthermore, the 3D inductor 122(2) is also inserted within the 3D inductor 122(1) so that a conductive path 144(2) partially extends through the 3D volume 146(1). More specifically, the second turn 138(1) is interwoven with the first turn 138(1). Thus, an elongated via column 124c(2) extends though the 3D volume 146(1). Additionally, the connector plate 130b(2) partially extends through the 3D volume 146(1). However, the connector plate 130b(1), the elongated via column 124a(1), the elongated via column 124c(1), and the elongated via column 124d(1) of the 3D inductor 122(1) are outside of the 3D volume 146(2) and at the exterior of the 3D inductor 122(2). Additionally, the elongated via column 124a(2), the elongated via column 124b(2), the connector plate 130a(2), and the elongated via column 124d(2) of the 3D inductor 122(2) are outside of the 3D volume 146(1) and at the exterior of the 3D inductor 122(1).

By inserting the 3D inductor 122(1) into the 3D inductor 122(2), the 3D inductor 122(1) can be magnetically coupled to the 3D inductor 122(2). As explained above, the 3D inductor 122(2) and the 3D inductor 122(1) are oriented so that the 3D inductor 122(1) is rotated by 90 degrees relative to the x-y-axis. Furthermore, the 3D inductor 122(1) and the 3D inductor 122(2) have a displacement relative to the x-axis, a displacement relative to the y-axis, and a displacement relative to the z-axis. The conductive path 144(2) is shaped as a two dimensional (2D) lobe 148(2) laid over the 3D volume 146(2) such that, in response to a current I(2) being provided through the conductive path 144(2), the conductive path 144(2) is configured to generate the magnetic field H(2) that predominantly embraces the conductive path 144(2) along the interior of the 3D inductor 122(2), as shown by the magnetic field H(1). The conductive path 144(1) is shaped as a 2D lobe 148(1) laid over the 3D volume 146(1) such that, in response to a current I(1) being provided through the conductive path 144(1), the conductive path 144(1) is configured to generate a magnetic field H(1) that predominantly embraces the conductive path 144(1) along the interior of the 3D inductor 122(2).

With respect to the embodiment shown in FIG. 5, the elongated via column 124c(1) of the 3D inductor 122(1) and the elongated via column 124b(2) of the 3D inductor 122(2) are magnetically coupled to one another. To do this, a third interior column surface of the elongated via column 124c(2) of the 3D inductor 122(2) faces a sixth interior column surface of the elongated via column 124(b1) of the 3D inductor 122(1). The magnetic field H(2) is generated so as to embrace the interior of the 3D inductor 122(2). Accordingly, an x-y displacement between the third interior column surface of the elongated via column 124c(2) of the 3D inductor 122(2) and the sixth interior column surface of the elongated via column 124b(1) of the 3D inductor 122(1) determines an amount of magnetic coupling between the elongated via column 124c(2) of the 3D inductor 122(2) and the elongated via column 124b(1) of the 3D inductor 122(1).

Additionally, the third exterior column surface of the elongated via column 124c(2) of the 3D inductor 122(2) faces the eighth interior column surface of the elongated via column 124d(1) of the 3D inductor 122(1). The magnetic field H(1) is generated so as to embrace the interior of the 3D inductor 122(1). Accordingly, an x-y displacement between the third exterior column surface of the elongated via column 124c(2) of the 3D inductor 122(2) and the eighth interior column surface of the elongated via column 124d(1) of the 3D inductor 122(1) determines an amount of magnetic coupling between the elongated via column 124c(2) of the 3D inductor 122(2) and the elongated via column 124d(1) of the 3D inductor 122(1). In this embodiment, the x-y displacement between the third exterior column surface of the elongated via column 124c(2) of the 3D inductor 122(2) and the eighth interior column surface of the elongated via column 124d(1) of the 3D inductor 122(1) is greater than the x-y displacement from a geometric centroid of the 3D inductor 122(1) to the third exterior column surface of the elongated via column 124c(2) of the 3D inductor 122(2) and the eighth interior column surface of the elongated via column 124d(1) of the first 3D inductor 122(1). Therefore, the elongated via column 124c(2) of the 3D inductor 122(2) and the elongated via column 124d(1) of the second 3D inductor 122(1) are not significantly magnetically coupled.

Furthermore, the first interior column surface of the elongated via column 124a(2) of the 3D inductor 122(2) faces the sixth exterior column surface of the elongated via column 124b(1) of the 3D inductor 122(1). The magnetic field H(2) is generated so as to embrace the interior of the 3D inductor 122(2). Accordingly, an x-y displacement between the first interior column surface of the elongated via column 124a(2) of the 3D inductor 122(2) and the sixth exterior column surface of the elongated via column 124b(1) of the 3D inductor 122(1) determines an amount of magnetic coupling between the elongated via column 124a(2) of the 3D inductor 122(2) and the elongated via column 124b(1) of the 3D inductor 122(1). In this embodiment, the x-y displacement between the first interior column surface of the elongated via column 124a(2) of the 3D inductor 122(2) and the sixth exterior column surface of the elongated via column 124b(1) of the second 3D inductor 122(1) is greater than the x-y displacement from a geometric centroid of the 3D inductor 122(2) to the first interior column surface of the elongated via column 124a(2) of the 3D inductor 122(2) and the sixth exterior column surface of the elongated via column 124b(1) of the 3D inductor 122(1). Therefore, the elongated via column 124a(2) of the 3D inductor 122(2) and the elongated via column 124b(1) of the second 3D inductor 122(1) are not significantly magnetically coupled.

The elongated via column 124b(2) and the elongated via column 124c(1) are adjacent to one another. However, the elongated via column 124b(2) and the elongated via column 124c(1) do not provide significant coupling. Rather, the elongated via column 124b(2) and the elongated via column 124c(1) have each of their thin sides next to one another, which does not provide significant magnetic coupling.

Furthermore, the elongated via column 124d(2) and the elongated via column 124a(1) are adjacent to one another. However, the elongated via column 124d(2) and the elongated via column 124a(1) do not provide significant coupling. Rather, the elongated via column 124d(2) and the elongated via column 124a(1) have each of their thin sides next to one another, which does not provide significant coupling. The 3D inductor 122(3) is identical in structure to the 3D inductors 122(1) and 122(2). However, the 3D inductor 122(3) is used as the notch filter inductor $L_{NOTCH1}$ and is physically separated from the 3D inductors 122(1) and 122(2). As such, the 3D inductor 122(3) is not significantly magnetically coupled to either of the 3D inductors 122(1) and 122(2). A current I(3) flows through a conductive path 144(3) during operation of the coupling filter circuitry 12S.

Figure 6:
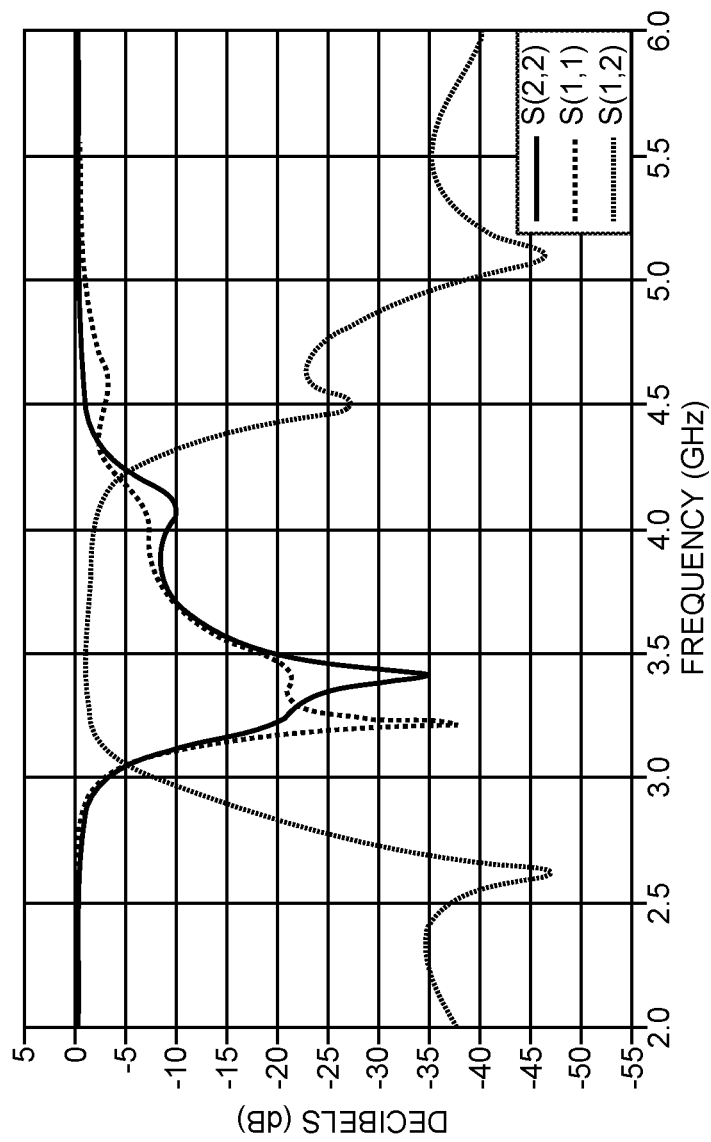
FIG. 6 is a graph of simulated gain for scattering parameters versus a frequency range of 2 GHz to 6 GHz for a switchless TX signal path of an embodiment of the present disclosure.
Figure 7:
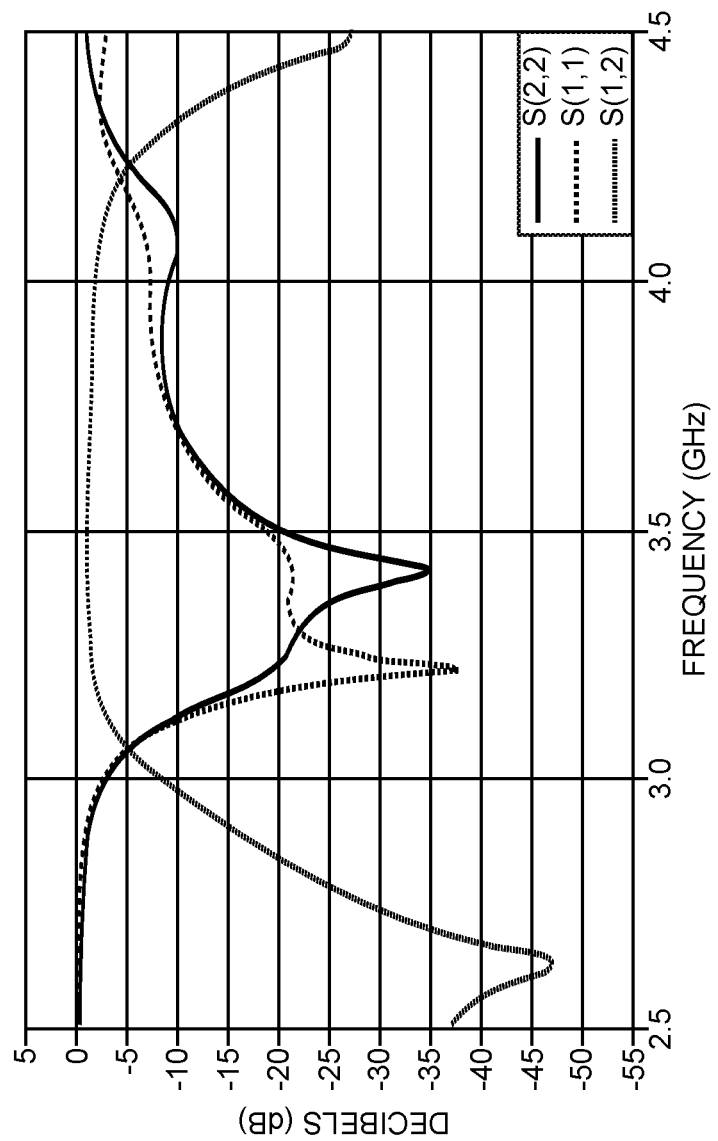
FIG. 7 is a graph of simulated gain for scattering parameters versus a frequency range of 2.5 GHz to 4.5 GHz for a switchless TX signal path of an embodiment of the present disclosure.
Figure 8:
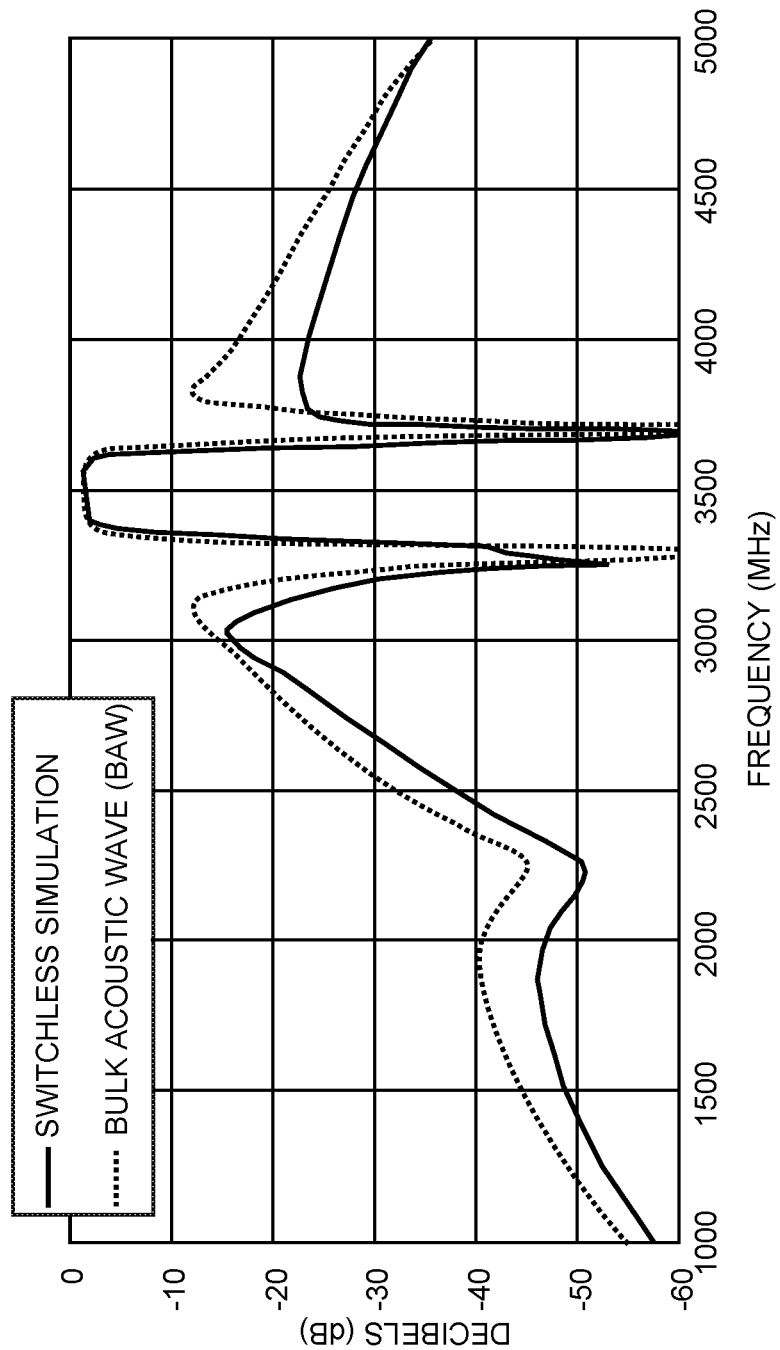
FIG. 8 is a graph of a comparison of frequency response between simulated results for a present embodiment and a bulk acoustic wave (BAW) filter for a frequency range of 1000 MHz to 5000 MHz.
Figure 9:
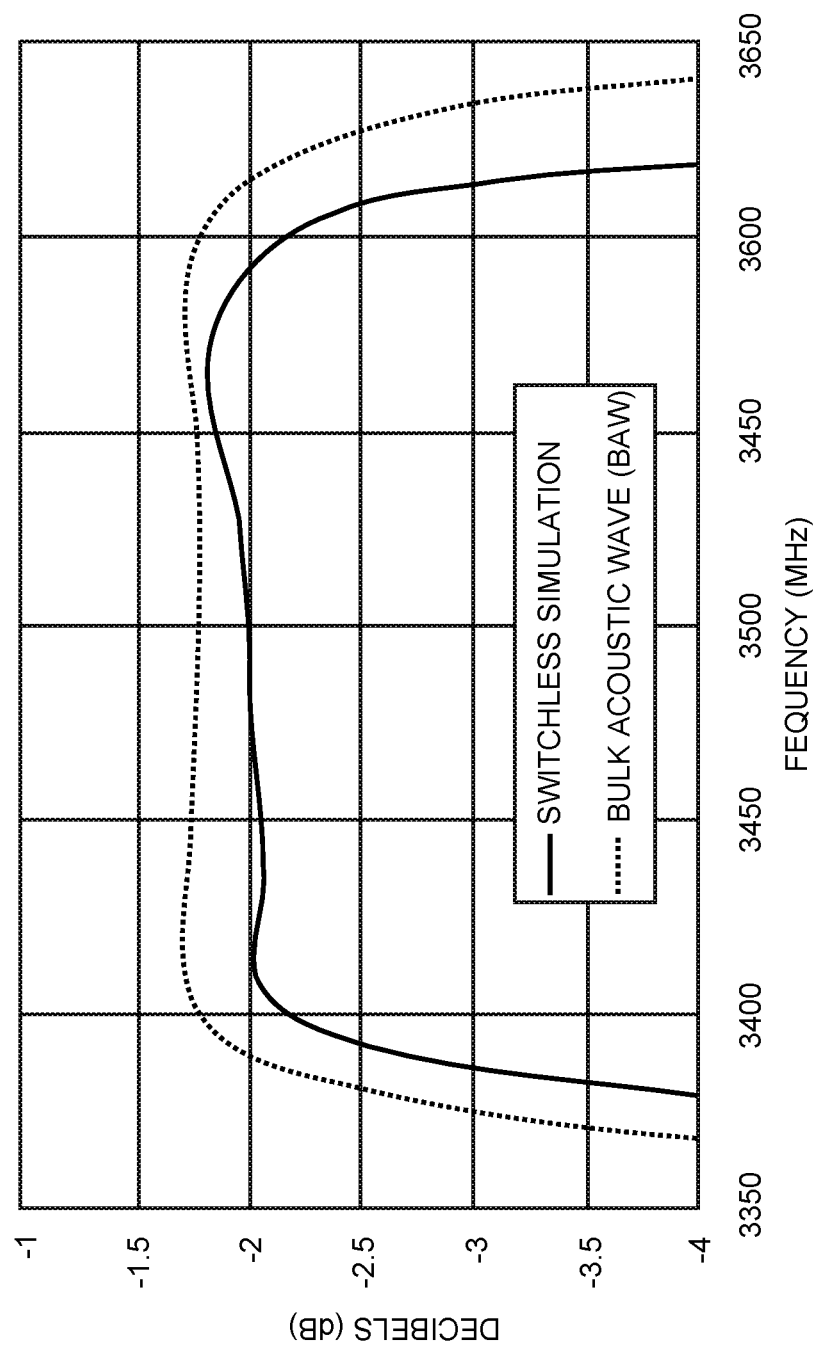
FIG. 9 is a graph of a comparison of frequency response between simulated results for a present embodiment and a bulk acoustic wave (BAW) filter for a frequency range of 3350 MHz to 3650 MHz.
Figure 10:
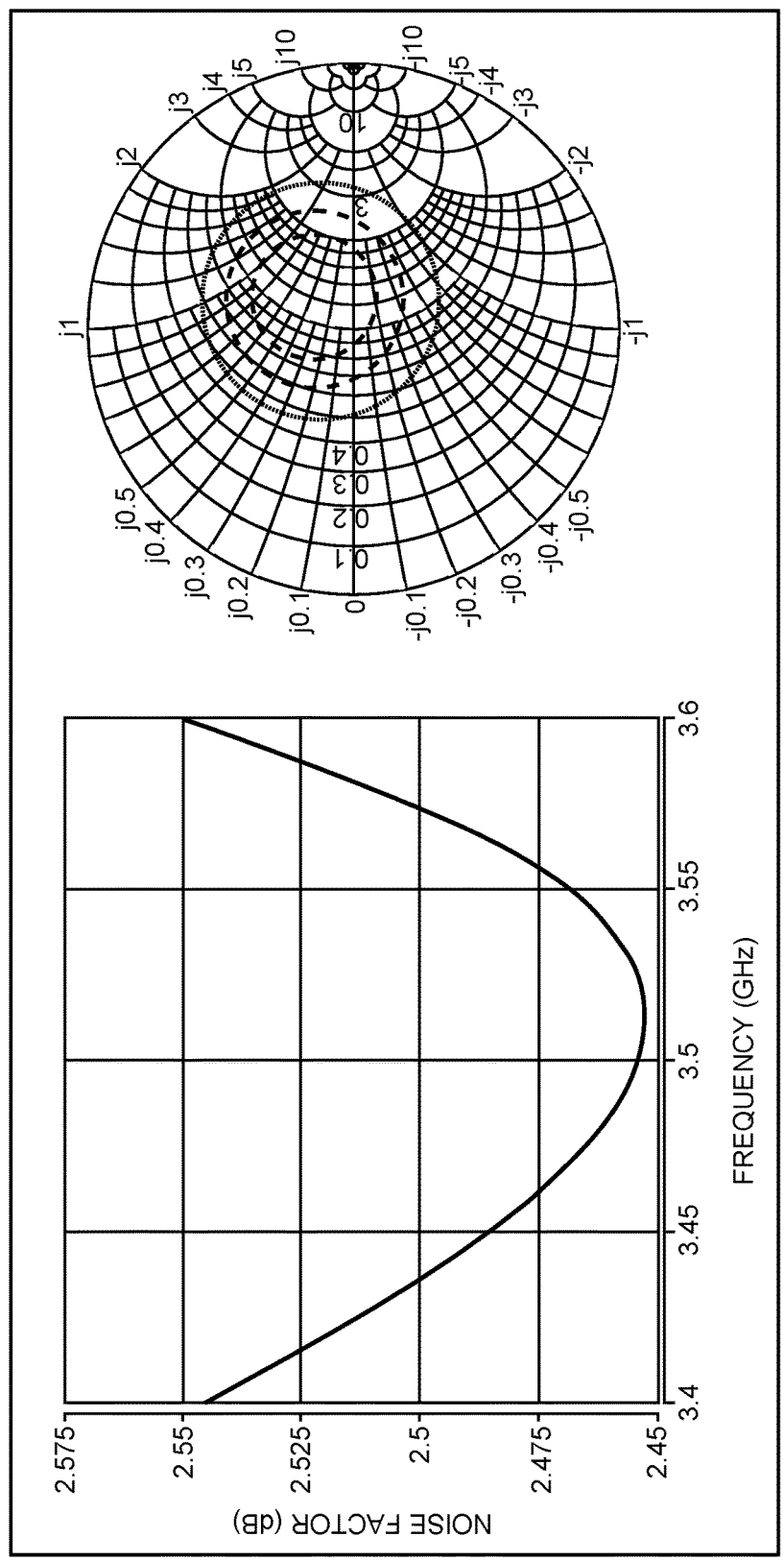
FIG. 10 is an RX signal path noise figure plot and a noise circle plot on a Smith Chart.
Figure 11:
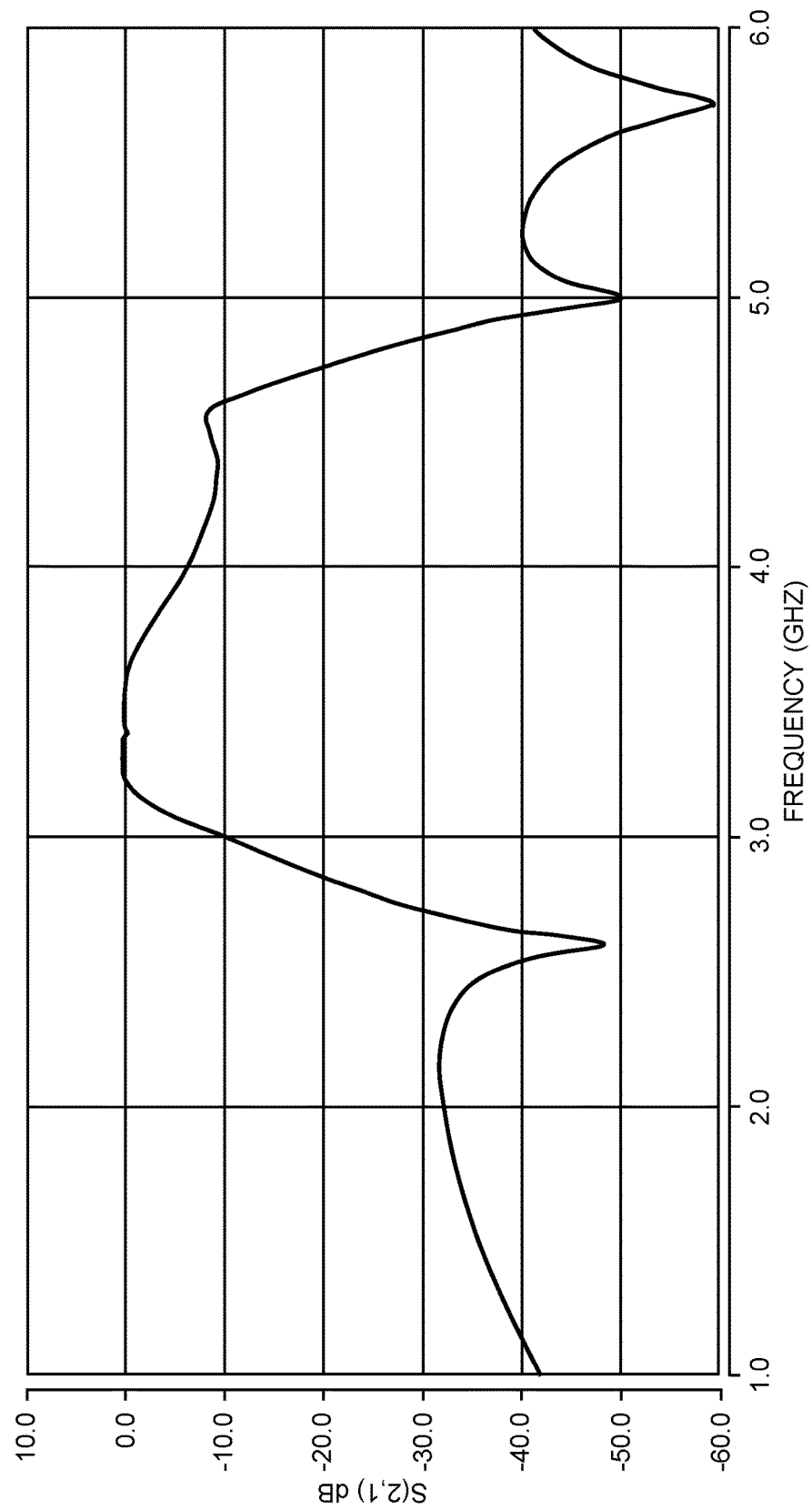
FIG. 11 is a graph of the S(2,1) scattering parameter simulated gain versus a frequency range of 1 GHz to 6 GHz.

Relatively low insertion loss and other high performance characteristics of embodiments of the RF front-end without signal switches can be ascertained from FIGS. 6-11. FIG. 6 is a graph of simulated gain for scattering parameters versus a frequency range of 2 GHz to 6 GHz for a switchless TX signal path of an embodiment of the present disclosure. FIG. 7 is a graph of simulated gain for scattering parameters versus a frequency range of 2.5 GHz to 4.5 GHz for a switchless TX signal path of an embodiment of the present disclosure. FIG. 8 is a graph of a comparison of frequency response between simulated results for a present embodiment and a bulk acoustic wave (BAW) filter for a frequency range of 1000 MHz to 5000 MHz. FIG. 9 is a graph of a comparison of frequency response between simulated results for a present embodiment and a bulk acoustic wave (BAW) filter for a frequency range of 3350 MHz to 3650 MHz. FIG. 10 is an RX signal path noise figure plot and a noise circle plot on a Smith Chart. FIG. 11 is a graph of the S(2,1) scattering parameter simulated gain versus a frequency range of 1 GHz to 6 GHz.

Figure 12:
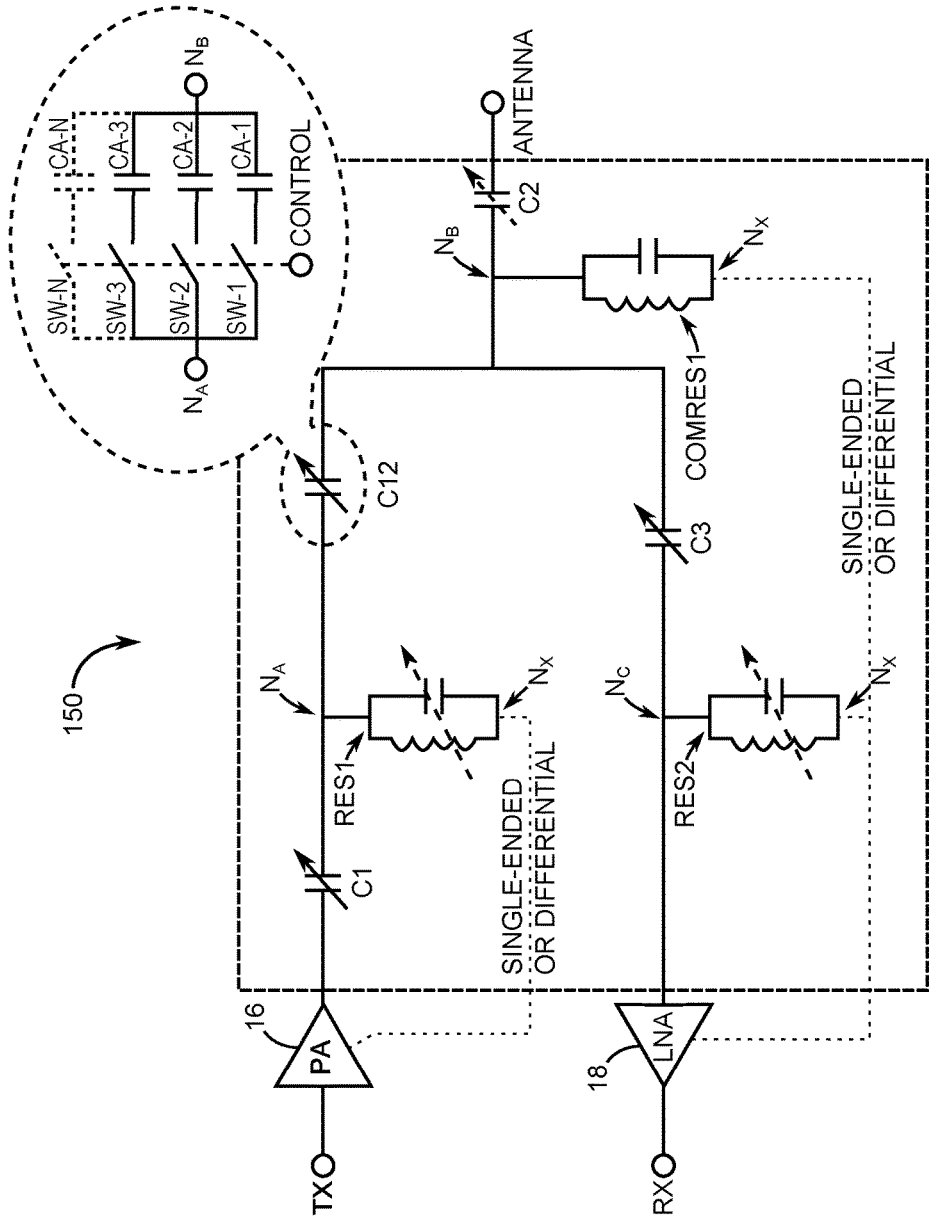
FIG. 12 is a schematic of an exemplary embodiment for TX-RX multiplexing using coupling filter circuitry with coupling factor tuning and without signal switches.

FIG. 12 is a schematic of an exemplary embodiment for TX-RX multiplexing using coupling filter circuitry 150 with coupling factor tuning and without signal switches. The coupling filter circuitry 150 has adjustable coupling coefficients provided by variable capacitors C1, C12, C2, and C3, and the first resonator RES1, the second resonator RES2, and a common resonator COMRES1. The first variable capacitor C1 is coupled between an output of the PA 16 and a first node $N_A$. The second capacitor C12 is coupled between the first node $N_A$ and a second node $N_B$. The third capacitor C2 is coupled between the second node $N_B$ and the antenna port. The fourth capacitor C3 is coupled between the second node $N_B$ and the input of the LNA 18. The first resonator RES1 is coupled between the first node $N_A$ and a fourth node $N_X$ that can be either single-ended or differential. Any of the variable capacitors C1, C12, C2, and C3 can be a programmable array of capacitors, such as shown in large dashed oval for the second capacitor C12. In this embodiment, the programmable array of capacitors making up the second capacitor C12 comprises capacitors CA-1, CA-2, and CA-3 through CA-N that are selectable using switches SW-1, SW-2, and SW-3 through SW-N. A control for the switches SW-1, SW-2, and SW-3 through SW-N is connectable to a controller such as the digital controller 14 (FIG. 1).

During operation in a TX mode, the first capacitor C1, the second capacitor C12, the first resonator RES1, and the third capacitor C2 are all tuned such that a TX signal amplified by the PA 16 is passed to the antenna port ANTENNA. Moreover, the fourth capacitor C3 and the second resonator RES2 are tuned away from the TX signal to block the TX signal from the LNA 18. In contrast, during operation in an RX mode, the third capacitor C2, the fourth capacitor C3, and the second resonator RES2 are tuned such that an RX signal at the antenna port ANTENNA is passed with low loss to the LNA 18. Further still, while in the RX mode, the first capacitor C1, the second capacitor C12, the first resonator RES1, and the third capacitor C2 are all tuned such that an RX signal at the antenna port ANTENNA is blocked by high impedance from being directed towards the PA 16.

Figure 13:
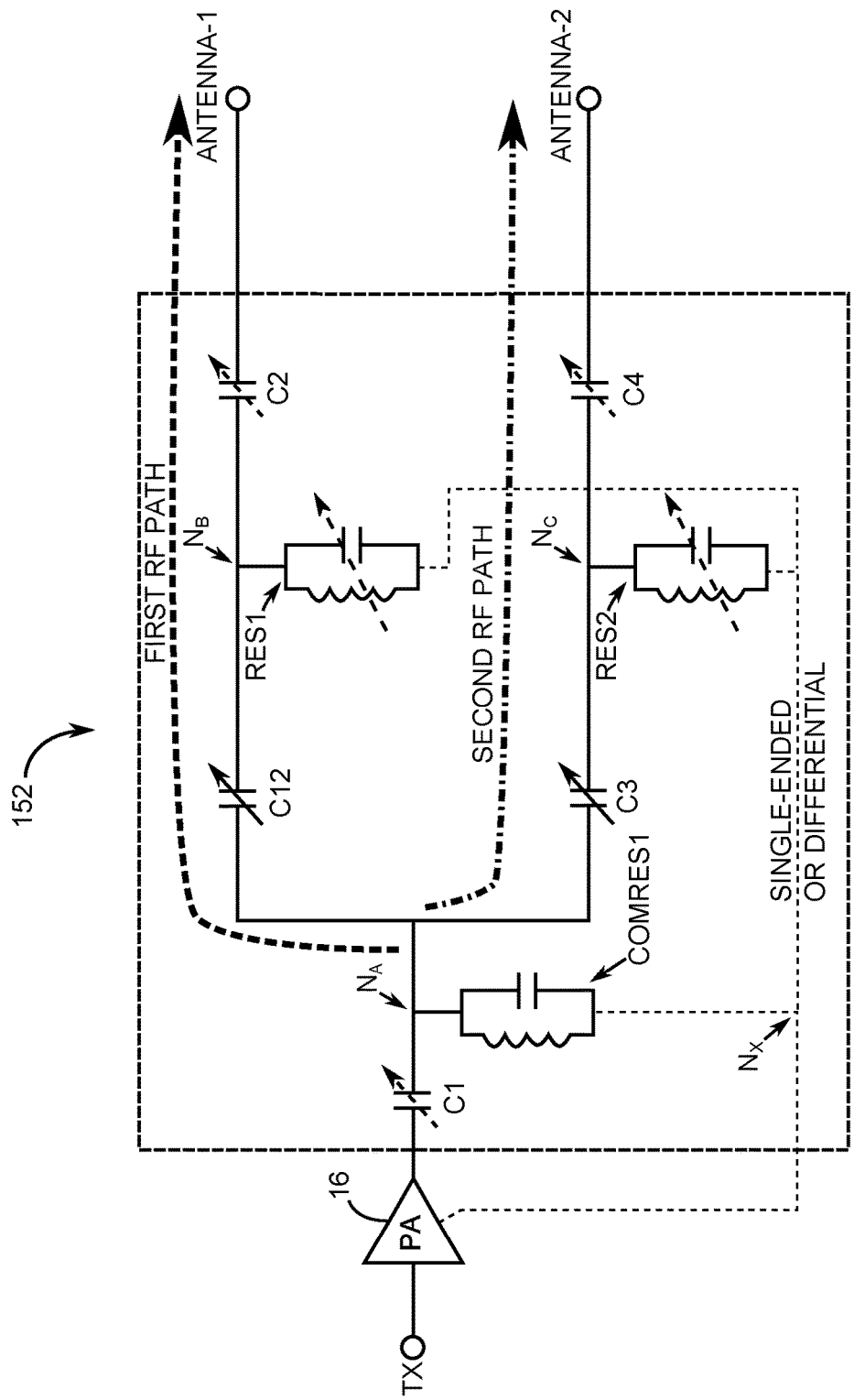
FIG. 13 is a schematic of an exemplary embodiment for antenna swapping using coupling filter circuitry with coupling factor tuning and without signal switches.

FIG. 13 is a schematic of an exemplary embodiment for antenna swapping using coupling filter circuitry 152 with coupling factor tuning and without signal switches. In this embodiment, the first capacitor C1 is coupled between the output of the PA 16 and the first node $N_A$. The common resonator COMRES1 is coupled between the first node $N_A$ and the fourth node $N_X$ that can be either single-ended or differential.

A first RF path branches from the first node $N_A$ to control transmission of a TX signal to a first antenna port ANTENNA-1. The first RF path includes the second capacitor C12 that is coupled between the first node $N_A$ and the second node $N_B$, and the third capacitor C2 coupled between the second node $N_B$ and the first antenna port ANTENNA-1. The first resonator RES1 is coupled between the second node $N_B$ and the fourth node $N_X$ that can be either single-ended or differential.

A second RF path branches from the first node $N_A$ to control transmission of the TX signal to the second antenna port ANTENNA-2. The second RF path includes the fourth capacitor C3 that is coupled between the first node $N_A$ and a third node $N_C$, and a fifth capacitor C4 coupled between the third node $N_C$ and the second antenna port ANTENNA-2. The second resonator RES2 is coupled between the second node $N_C$ and the fourth node $N_X$ that can be either single-ended or differential.

During operation of a first TX mode, a TX signal is directed through the first RF path to the first antenna port ANTENNA-1 by tuning the first capacitor C1, the second capacitor C2, the first resonator RES1 and the third capacitor C2 such that the TX signal is presented with a low impedance path to the first antenna port ANTENNA-1. Also, while in the first TX mode, the TX signal is blocked by high impedance by tuning the fourth capacitor C3, the second resonator RES2 and the fifth capacitor C4 away from the TX signal.

During operation of a second TX mode, a TX signal is directed through the second RF path to the second antenna port ANTENNA-2 by tuning the first capacitor C1, the fourth capacitor C3, the second resonator RES2 and the fifth capacitor C4 such that the TX signal is presented with a low impedance path to the second antenna port ANTENNA-2. Also, while in the second TX mode, the TX signal is blocked by high impedance by tuning the second capacitor C12, the first resonator RES1 and the third capacitor C2 away from the TX signal.

Those skilled in the art will recognize improvements and modifications to the embodiments of the present disclosure.

All such improvements and modifications are considered within the scope of the concepts disclosed herein and the claims that follow.

What is claimed is:

1. A radio frequency (RF) front-end comprising:
a first resonator having a first port and a second port;
a second resonator having a third port and a fourth port, wherein the first resonator and the second resonator are magnetically coupled; and
a coupling structure coupled between the second port of the first resonator and the third port of the second resonator, wherein the coupling structure has a coupling control input for varying a coupling coefficient between the first resonator and the second resonator such that RF signal transfer between the first port of the first resonator and the fourth port of the second resonator is variably controlled;
wherein the first resonator comprises:
a first three dimensional (3D) inductor having a first conductive path shaped as a first two dimensional (2D) lobe laid over a first volume; and
wherein the second resonator comprises:
a second 3D inductor having a second conductive path, wherein the second 3D inductor is inserted into the first 3D inductor so that the second conductive path at least partially extends through the first volume.

2. The RF front-end of claim 1 wherein the RF front-end does not include signal switches.

3. The RF front-end of claim 1 wherein the first resonator and the second resonator are magnetically coupled by no more than 5%.

4. The RF front-end of claim 1 wherein the RF signal transfer between the first port of the first resonator and the fourth port of the second resonator is variably controlled between 5% and 95% by way of controlling the coupling coefficient of the coupling structure.

5. The RF front-end of claim 1 wherein the coupling structure provides electrical coupling.

6. The RF front-end of claim 5 wherein the coupling structure provides variable capacitance.

7. The RF front-end of claim 6 wherein the coupling structure is a programmable array of capacitors comprising:
a first capacitor;
a second capacitor in parallel with the first capacitor;
a first switch in series with the first capacitor; and
a second switch in series with the second capacitor, wherein the coupling control input is configured to independently route control signals to the first switch and the second switch.

8. The RF front-end of claim 1 further including a digital controller having a control output coupled to the control input of the coupling structure for varying the coupling coefficient between the first resonator and the second resonator.

9. The RF front-end of claim 8 wherein the first resonator has a resonator control input coupled to the digital controller to command either passing or blocking RF signal transfer between the first port and second port of the first resonator by digitally tuning to within a pass frequency range and a block frequency range of the first resonator.

10. The RF front-end of claim 8 wherein the second resonator has a resonator control input coupled to the digital controller to command either passing or blocking RF signal transfer between the third port and fourth port of the second resonator by digitally tuning to within a pass frequency range and a block frequency range of the second resonator.

11. The RF front-end of claim 8 wherein the first resonator and the second resonator each have a resonator control input coupled to the digital controller to command either passing or blocking RF signal transfer between the first port of the first resonator and the fourth port of the second resonator by digitally tuning to within pass frequency ranges and block frequency ranges of the first resonator and the second resonator.

12. The RF front-end of claim 1 wherein the first conductive path is shaped as the first 2D lode laid over the first volume such that, in response to a current being provided through the first conductive path, the first conductive path is configured to generate a magnetic field that predominately embraces the first conductive path along an interior of the first 3D inductor.

13. The RF front-end of claim 1 wherein the second conductive path of the second 3D inductor is shaped as a second 2D lobe laid over a second volume wherein the second 3D inductor is inserted into the first 3D inductor so that the second volume at least partially overlaps the first volume.

14. The RF front-end of claim 13 wherein:
the second conductive path only partially extends through the first volume; and
the first 3D inductor is also inserted within the second 3D inductor so that the first conductive path partially extends through the second volume.

15. The RF front-end of claim 13 wherein the first conductive path and the second conductive path are interleaved such that the second conductive path only partially extends through the first volume and the first conductive path partially extends through the second volume.

16. The RF front-end of claim 13 wherein:
the first 3D inductor comprises a first elongated via column that forms part of the first conductive path, wherein the first elongated via column is elongated along a first plane to define a first column surface that faces toward an interior of the first 3D inductor; and
the second 3D inductor comprises a second elongated via column that forms part of the second conductive path, wherein the second elongated via column extends through the first volume and wherein the second elongated via column is elongated along a second plane to define a second column surface that faces toward an exterior of the second 3D inductor and towards the first column surface of the first elongated via column.

17. The RF front-end of claim 16 wherein the first plane and the second plane are oriented substantially the same but are positioned so that the first column surface and the second column surface are displaced.

18. The RF front-end of claim 16 wherein:
the first 3D inductor further comprises a third elongated via column that forms another part of the first conductive path, wherein the third elongated via column extends through the second volume and wherein the third elongated via column is elongated along a third plane to define a third column surface that faces toward an exterior of the first 3D inductor; and
the second 3D inductor further comprises a fourth elongated via column that forms another part of the second conductive path, wherein the fourth elongated via column is elongated along a fourth plane to define a fourth column surface that faces toward an interior of the second 3D inductor and towards the third column surface of the third elongated via column.

19. The RF front-end of claim 18 wherein the first plane, the second plane, the third plane and the fourth plane are oriented substantially the same but are positioned so that the first column surface, the second column surface, the third column surface, and the fourth column surface are displaced.

* * * * *